United States Patent [19]

Rogo et al.

[11] Patent Number: 4,531,886
[45] Date of Patent: Jul. 30, 1985

[54] DRUM PUMP

[76] Inventors: Casimir Rogo, 29528 N. Seaway Ct., Mt. Clemens, Mich. 48045; Aldo Urbani, 7000 Stockport, Lambertville, Mich. 48144

[21] Appl. No.: 482,029

[22] Filed: Apr. 4, 1983

[51] Int. Cl.³ .......................... F16D 3/46; F01D 1/18
[52] U.S. Cl. ...................................... 415/90; 415/112; 415/206; 184/6.11; 184/6.3
[58] Field of Search ............... 415/89, 90, 112, 170 A, 415/175, 176, 206; 184/6.11, 6.34; 60/39.08; 416/174

[56] References Cited

U.S. PATENT DOCUMENTS

| | | | |
|---|---|---|---|
| 3,004,806 | 10/1961 | Schinnerer | 308/187 |
| 3,038,556 | 6/1962 | Hamm et al. | 184/6.11 |
| 3,244,109 | 4/1966 | Barske | 415/206 |
| 3,514,943 | 6/1970 | Britt | 60/39.08 |
| 3,532,443 | 10/1970 | Johnson | 60/39.08 X |
| 3,617,148 | 11/1971 | Endress | 415/90 |
| 3,656,583 | 4/1972 | Hornbeck | 184/6.11 |
| 3,728,857 | 4/1973 | Nichols | 184/6.11 X |
| 3,746,128 | 7/1973 | Wunsch | 184/6.11 |
| 3,757,535 | 9/1973 | Stein | 184/6.11 X |
| 4,128,362 | 12/1978 | Shepherd et al. | 415/112 |
| 4,144,950 | 3/1979 | Moyer et al. | 184/6.11 |

FOREIGN PATENT DOCUMENTS 1097451  1/1961  Fed. Rep. of Germany ..... 184/6.11

Primary Examiner—Robert E. Garrett
Assistant Examiner—Joseph M. Pitko

[57] ABSTRACT

A drum pump for a turbine which comprises a turbine housing having an internal wall defining an interior cylindrical chamber. A cylindrical drum having an outer cylindrical surface and an annular channel formed on its inner surface is coaxially rotatably mounted to the housing within the housing chamber so that the outer periphery of the drum is spaced radially inwardly from the housing wall. A pair of axially spaced annular fluid seals extend between the housing and the outer periphery of the drum and form an annular outlet chamber therebetween. At least one outlet passageway is formed in the housing and open to the outlet chamber while, similarly, a connecting passageway is formed from the drum and extends between the channel and the outlet chamber. A fluid jet supplies fluid to the drum channel so that, upon rotation of the drum, the fluid is centrifugally pumped out through the connecting passageway, to the outlet chamber and out through the outlet passageway in the housing.

8 Claims, 2 Drawing Figures

4,531,886

DRUM PUMP

BACKGROUND OF THE INVENTION

I. Field of the Invention

The present invention relates generally to pumps and, more particularly, to a drum pump.

II. Description of the Prior Art

There are a number of previously known pumps used with turbine engines for pumping fluid, such as the engine lubrication. These previously known pumps include centrifugal bladed pumps, positive displacement vane pumps, piston pumps, ejector and lobed or Lysholm type pumps. These previously known devices all share certain advantages and disadvantages, but none provide a combined high efficiency and compact pump with a minimum sump volume requirement and self-priming feature.

SUMMARY OF THE PRESENT INVENTION

The present invention provides a drum pump which overcomes the above-mentioned disadvantages of the previously known devices.

In brief, the pump of the present invention comprises a cylindrical drum having an outer cylindrical surface and an inner surface. A radially extending annular channel is formed in the inner surface of the drum so that the channel is coaxial with but spaced radially inwardly from the outer cylindrical drum surface.

The drum is rotatably mounted in an interior cylindrical chamber formed within the turbine housing so that the drum is coaxial with but spaced radially inwardly from an interior cylindrical wall of the turbine housing. The drum is rotatably driven within the housing chamber by the main turbine shaft.

A pair of axially spaced annular fluid seals extend between the housing wall and the outer periphery of the drum so that the seals form an annular outlet chamber therebetween. At least one outlet passageway is formed in the housing and open to the outlet chamber while, similarly, at least one connecting passageway is formed in the drum and extends between the channel and the outlet chamber.

In the perferred form of the invention, a fluid, such as engine lubrication, is supplied to the channel by a fluid jet. Consequently, upon rotation of the drum by the turbine shaft, the drum centrifugally pumps the fluid out through the connecting passageway, into the annular chamber and out through the outlet passageway in the housing.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 2:
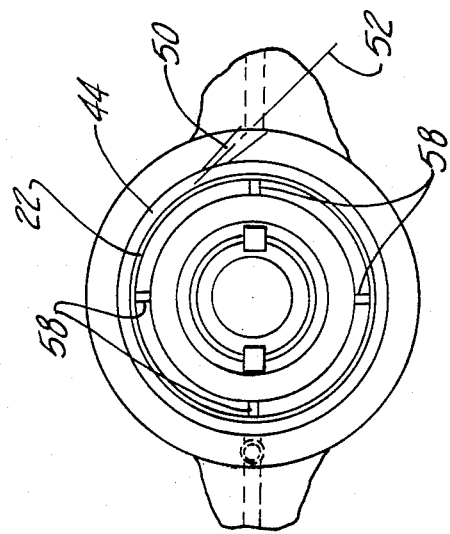
FIG. 2 is a cross sectional view taken substantially along line 2—2 in FIG. 1.

With reference to the drawing, a preferred embodiment of the present invention is thereshown and comprises a turbine housing 10 defining an interior cylindrical chamber 12 having an outer cylindrical wall 14. A main turbine shaft 16 is rotatably mounted to the housing 10 by a bearing assembly 18 so that one end 20 of the shaft 16 protrudes coaxially into the housing chamber 12.

A cylindrical drum 22 having an outer cylindrical surface 24 is rotatably mounted within the housing chamber 12 and sealed by rub seal assemblies 26 and 28. The drum 22 is coaxial with the housing chamber 12 and dimensioned so that its outer cylindrical surface 24 is spaced radially inwardly from the housing cylindrical wall 14.

The drum 22 further includes an inner surface 30 in which a radially outwardly extending annular channel 32 is formed. An annular opening 34 is formed at one end of the drum 22 and this opening 34 is open to the channel 32.

Figure 1:
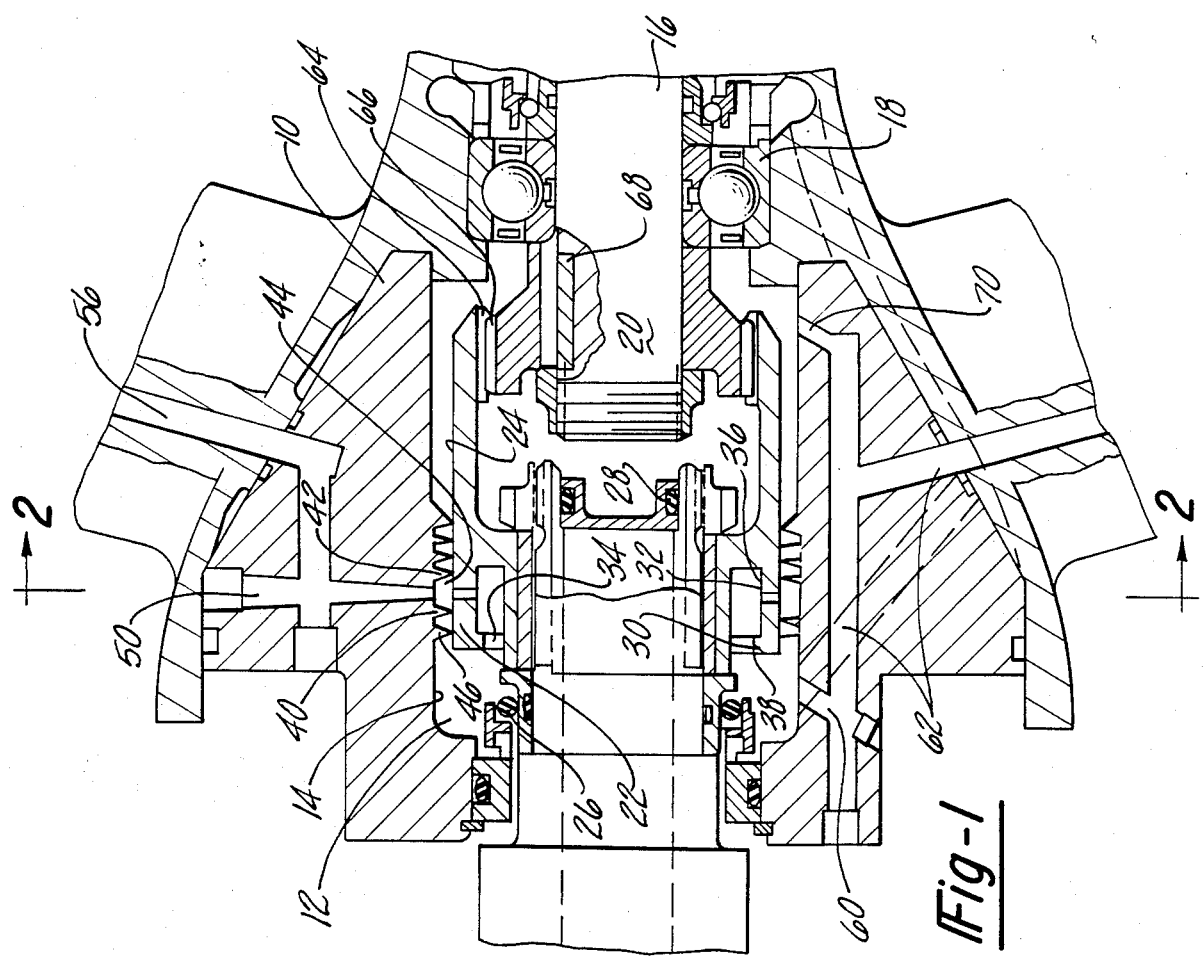
FIG. 1 is a fragmentary longitudinal sectional view illustrating a perferred embodiment of the present invention.

As best shown in FIG. 1, the channel 32 includes a cylindrical base 36 although the cross sectional shape of the channel 32 can vary without departing from the spirit or scope of the invention. A radially inwardly extending lip 38 is formed along one side of the channel 36 and the lip 38 terminates at the drum opening 34.

Still referring to FIG. 1, two annular Labyrinth seals 40 and 42 are secured to the housing 10 and extend between the housing wall 14 and the outer cylindrical surface 24 of the drum 22. The seals 40 and 42 are axially spaced from each other and thus form an annular outlet chamber 44 therebetween. Additional Labyrinth seals 46 can also be provided between the housing 10 and the drum 22 to enhance fluid seal between the housing 10 and drum 22.

With reference now to FIGS. 1 and 2, at least one outlet passageway 50 is formed in the housing 10 so that one end of the passageway 50 is open to the outlet chamber 44. The outlet passageway 50 is preferably frusto-conical in shape having its smaller diameter end open to the outlet chamber 44. In addition, as best shown in FIG. 2, the outlet passageway 50 is preferably elongated and has its longitudinal axis 52 substantially tangential to the outlet passageway 44. The outlet passageway 50 is connected to a fluid system by fluid passageways 56.

With reference again to FIGS. 1 and 2, at least one and preferably several radial connecting passageways 58 are formed through the drum 22 so that an outer radial end of each connecting passageway 58 is open to the outlet chamber 44 while the inner radial end of each connecting passageway 58 is open to the channel 32. The connecting passageways 58 are preferably circumferentially equidistantly spaced from each other, as best shown in FIG. 2.

With reference again particularly to FIG. 1, a fluid jet 60 is mounted to or formed in the turbine housing 10 and is connected by passageways 62 to a pressurized fluid source, such as the turbine lubrication system. The jet 60 is open to the housing cylindrical wall 14 adjacent the open end 34 of the drum 22. In addition, the jet 60 is oriented so that it discharges fluid under pressure through the drum annular opening 34 and into the channel 32.

Still referring to FIG. 1, in the preferred form of the invention, the drum 22 is rotatably driven in unison with the turbine shaft 16. To accomplish this, a female spline 64 is formed at one end of the drum 22 which meshes with a male spline 66 secured to the end 20 of the turbine shaft 16. A key 68 locks the male spline 66 against rotation with respect to the shaft 16 so that the turbine shaft 16 and drum 22 rotate in unison with each other.

In operation, the drum 22 and shaft 16 rotate together at high speed. Simultaneously, the fluid jet 60 supplies fluid, such as engine lubrication, through the drum opening 34 and to the channel 32. This fluid is then centrifugally pumped out through the connecting passageways 58 formed in the drum 22 and to the outlet chamber 44. From the outlet chamber 44, the fluid is pumped through the outlet passageway 52, fluid system passageways 56 and to the fluid system.

In the preferred form of the invention, the drum 22 is employed to pump the engine lubrication for the turbine engine. Thus, as shown in FIG. 1, the fluid supply passageway 62 for the fluid jet 60 is also connected to a second jet 70 formed in the turbine housing 10. The second jet 70 is oriented so that it sprays the lubrication on the turbine shaft bearing assembly 18.

The pressure output from the drum is proportional to the square of the rotational speed of the drum times the internal drum radius. Furthermore, the fluid system is preferably a closed loop system, i.e., the outlet from the pump is ultimately returned to the jet 60, thus reducing churning of the fluid and pumping loses Although in the preferred form of the invention, the pump is employed to pump the engine lubrication, it can alternatively be used to pump other fluids including flocculated dispersions, thixotropic fluids, Newtonian fluids and slurries.

A primary advantage of the present invention is that the pump is compact in construction, highly efficient in operation and self-priming. Furthermore, the outlet passageway 44 forms a free vortex collector space that coalesces and prevents the formation of fluid droplets as well as reducing any foaming tendancy of the fluid. Also, the frusto-conical outlet passageway 50 efficiently diffuses the flow prior to delivery to the distribution system and reduces pumping losses. The tangential overtation of the outlet passageway 50 further enhances the efficiency of the pump by minimizing fluid losses.

Having described our invention, however, many modifications thereto will become apparent to those skilled in the art to which it pertains without deviation from the spirit of the invention as defined by the scope of the appended claims.

We claim:

1. A pump comprising:
   a housing having a cylindrical wall defining an interior cylindrical chamber,
   a cylindrical drum having an outer cylindrical surface, an inner surface and an annular channel formed on said inner surface and extending radially outwardly from said inner surface,
   means for coaxially rotatably mounting said drum to said housing within said housing chamber so that the outer periphery of said drum is spaced radially inwardly from said housing wall,
   a pair of axially spaced and substantially parallel annular fluid seals extending between said housing wall and said outer periphery of said drum, said seals forming an annular outlet chamber therebetween,
   at least one outlet passageway formed in said housing and open to said outlet chamber,
   at least one connecting passageway formed in said drum and extending between said channel and said outlet chamber,
   means for supplying a fluid to said drum channel, and
   means for rotatably driving said drum.

2. The invention as defined in claim 1 wherein said drum comprises one end open to said drum channel and wherein said supplying means comprises a fluid jet mounted to said housing so that a fluid discharge from said jet enters said drum channel through said open end of said drum.

3. The invention as defined in claim 1 wherein said channel comprises a cylindrical surface coaxial with the outer periphery of said drum and wherein said connecting passageway is open to said channel cylindrical surface.

4. The invention as defined in claim 1 wherein said housing is a turbine housing, a turbine shaft rotatably mounted in said housing, and wherein said rotatable driving means comprises means for drivingly connecting said shaft to said drum.

5. The invention as defined in claim 4 wherein said shaft and said drum are coaxially rotatably mounted to said housing and wherein said drivingly connecting means comprises a first splined portion on said drum, a second splined portion on said shaft and wherein said spline portions are in mesh.

6. The invention as defined in claim 1 wherein said outlet passageway is frusto-conical in shape having a small diameter end and a large diameter end, and wherein said small diameter end is open to said outlet chamber.

7. The invention as defined in claim 1 wherein said at least one connecting passageway comprises a plurality of circumferentially spaced and radially extending passageways.

8. The invention as defined in claim 1 wherein said outlet passageway is elongated and wherein the longitudinal axis of said outlet passageway is substantially tangential to said outlet chamber.

* * * * *